United States Patent [19]
Pilley

[11] Patent Number: 5,200,902
[45] Date of Patent: Apr. 6, 1993

[54] AIRPORT CONTROL/MANAGEMENT SYSTEM

[76] Inventor: Harold R. Pilley, R.F.D. #1, Box 204, Deering, N.H. 03244

[21] Appl. No.: 593,214

[22] Filed: Oct. 9, 1990

[51] Int. Cl.⁵ .......................................... G06F 15/48
[52] U.S. Cl. ................................. 364/439; 364/449; 340/990; 340/995
[58] Field of Search .............. 364/427, 428, 439, 449; 342/36, 38, 454, 455, 456; 340/947, 951, 953, 954, 955, 990, 991, 992, 995; 73/178 R, 178 T

[56] References Cited

U.S. PATENT DOCUMENTS

| | | | |
|---|---|---|---|
| 3,668,403 | 6/1972 | Meilander | 342/36 |
| 4,516,125 | 5/1985 | Schwab et al. | 342/36 |
| 4,660,037 | 4/1987 | Nakamura | 340/990 |
| 4,661,811 | 4/1987 | Gray et al. | 340/995 |
| 4,827,418 | 5/1989 | Gerstenfeld | 364/439 |
| 4,890,233 | 12/1989 | Ando et al. | 340/995 |
| 4,896,154 | 1/1990 | Factor et al. | 340/990 |
| 4,949,267 | 8/1990 | Gerstenfeld et al. | 364/439 |
| 4,975,696 | 12/1990 | Salter, Jr. et al. | 340/990 |
| 4,979,137 | 12/1990 | Gerstenfeld et al. | 364/439 |
| 5,025,382 | 6/1991 | Artz | 364/439 |

Primary Examiner—Gary Chin
Attorney, Agent, or Firm—Blodgett & Blodgett

[57] ABSTRACT

Image on a computer screen of a 3-dimensional vehicle path is superimposed on a 3-dimensional map of a local space envelope. The 3-dimensional image is then used to control/manage the traffic in an airport.

12 Claims, 2 Drawing Sheets

TAXI FROM STEAD TO 24 FOR TAKE OFF
VELOCITY (KNOTS) & ALTITUDE/10 (FEET)
VERSUS TIME

AIRPORT CONTROL/MANAGEMENT SYSTEM

BACKGROUND OF INVENTION

One of the major problems facing the world today is the fact that airplane travel has increased tremendously, while the airport facilities have not. Attempts to expand present airports and to build new ones have met with considerable resistance... not only because of aesthetic factors, but also simply because there is now no inexpensive land adjacent to the large cities.

Because it appears, therefore, difficult to meet increased air traffic demands by increasing airport facilities, it is obvious that a solution to the problem may lie in allowing a given airport to make more intensive use of its facilities. The limit to such a solution lies in the necessity to maintain satisfactory safety standards. Safety plays an important role in the accuracy and limits of present day surveillance systems, as well as flight dynamics for individual aircraft. Technological advances in aircraft, such as STOL, tilt rotor, and rotary wing, will enable the Terminal Control Area (TCA) to handle increased traffic loads without increasing the surface tarmac significantly.

The present airport control systems rely heavily on a radar display screen that shows the location of aircraft in flight in a two dimensional format; the individual planes are labelled for altitude and other factors; unfortunately, much of the work involves visual observation through the control tower window and verbal communication.

Considerable work has been done recently in attempts to improve airport traffic control. The patent of MUNDRA No. U.S. Pat. No. 4,890,232, for instance, has to do with a visual display apparatus for showing the relationship of two separate aircraft on converging runways. The patent of GERSTENFELD No. U.S. Pat. No. 4,827,418 describes an expert system for training control operators. The patent of GRAHAM et al U.S. Pat. No. 4,811,230 shows a flight management computer that includes an intervention system. The patent of THURMAN No. U.S. Pat. No. 4,706,198 describes a computerized airspace control system invoking a master control system and regional control units. A patent to SCHWAB et al U.S. Pat. No. 4,516,125 shows apparatus for monitoring vehicle ground movement in the vicinity of an airport and involves the processing of radar return video signals. The patent of LOMAX et al U.S. Pat. No. 4,075,666 shows a magnetic tape recorder for use in the continuous televising of air traffic control radar. The patents of VIETOR U.S. Pat. Nos. 3,875,379, 3,868,497, and 3,758,765 have to do with terminal airways traffic control; a ground-based computer issues speed commands. The patent of MASSA No. U.S. Pat. No. 3,855,571 describes an aircraft traffic control system involving a sound generator on each airplane that reaches selected microphones along its ground path, the signals thus received operating on a display panel in the form of a map., A patent of FELLMAN U.S. Pat. No. 3,787,056 relates to a game device for simulating aircraft traffic control and teaching the rules of traffic control. The patent of KURKJIAN U.S. Pat No. 3,731,312 has to do with an air traffic control utilizing rotating radial signals. In all of these cases, the airport controller lacks sufficient information to handle large amounts of aircraft landing and taking off, particularly when mixed with service vehicles on the ground. A great deal of the safety of these systems depends on the visual and verbal information that the control personnel picks up and this information is subject, of course, to the fallibility of the human mind. These and other difficulties experienced with the prior art devices and systems have been obviated in a novel manner by the present invention.

It is, therefore, an outstanding object of the invention to provide a cost-effective airport control/management system for vehicles which are operating in 3-dimensional space.

Another object of this invention is the provision of a control/management system, especially for aircraft control, in which a 3-dimensional display is produced to show the information necessary to operate an airport.

A further object of the present invention is the provision of a means for handling increased traffic at an airport without loss of safety.

A still further object of the invention is the provision of a system for superimposing a 3-dimensional display of local aircraft paths on an accurately-configured map of the local space.

It is a further object of the invention to provide an airport traffic control system which will permit an increase in airport capacity and safety, while allowing the airport to remain within present territorial boundaries.

Another object of the invention is the provision of an improved surveillance system for airport arrival and departure aircraft separation.

Another object of the invention is the provision of an airport control/management system that is suitable to the task of providing for increase traffic, while maintaining safety; that will enjoy a wide and growing market acceptance with declining life cycle costs; and that will integrate easily with other parts of the air traffic control and aircraft navigation systems.

With these and other objects in view, as will be apparent to those skilled in the art, the invention resides in the combination of parts set forth in the specification and covered by the claims appended hereto.

SUMMARY OF THE INVENTION

In general, the present invention has to do with an airport control/management system which has a means for establishing a precise 3-dimensional digital map of a selected airport space envelope, the map containing global positioning system reference points. A computer with a monitor screen is provided for receiving and displaying the 3-dimensional map. Means is provided that is located on at least one vehicle in the airport space envelope to receive continuous global navigation satellite system (GNSS) signals, calculate position, velocity, and heading and transmitting the information to a receiver associated with the computer. Means is provided within the computer to display a 3-dimensional image corresponding to the vehicle path on the 3-dimensional map.

More specifically, the global navigational satellite system includes a constellation of space satellites and the computer contains a program for manipulating the image of the vehicle path and the map together to a desired apparent line of observation.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
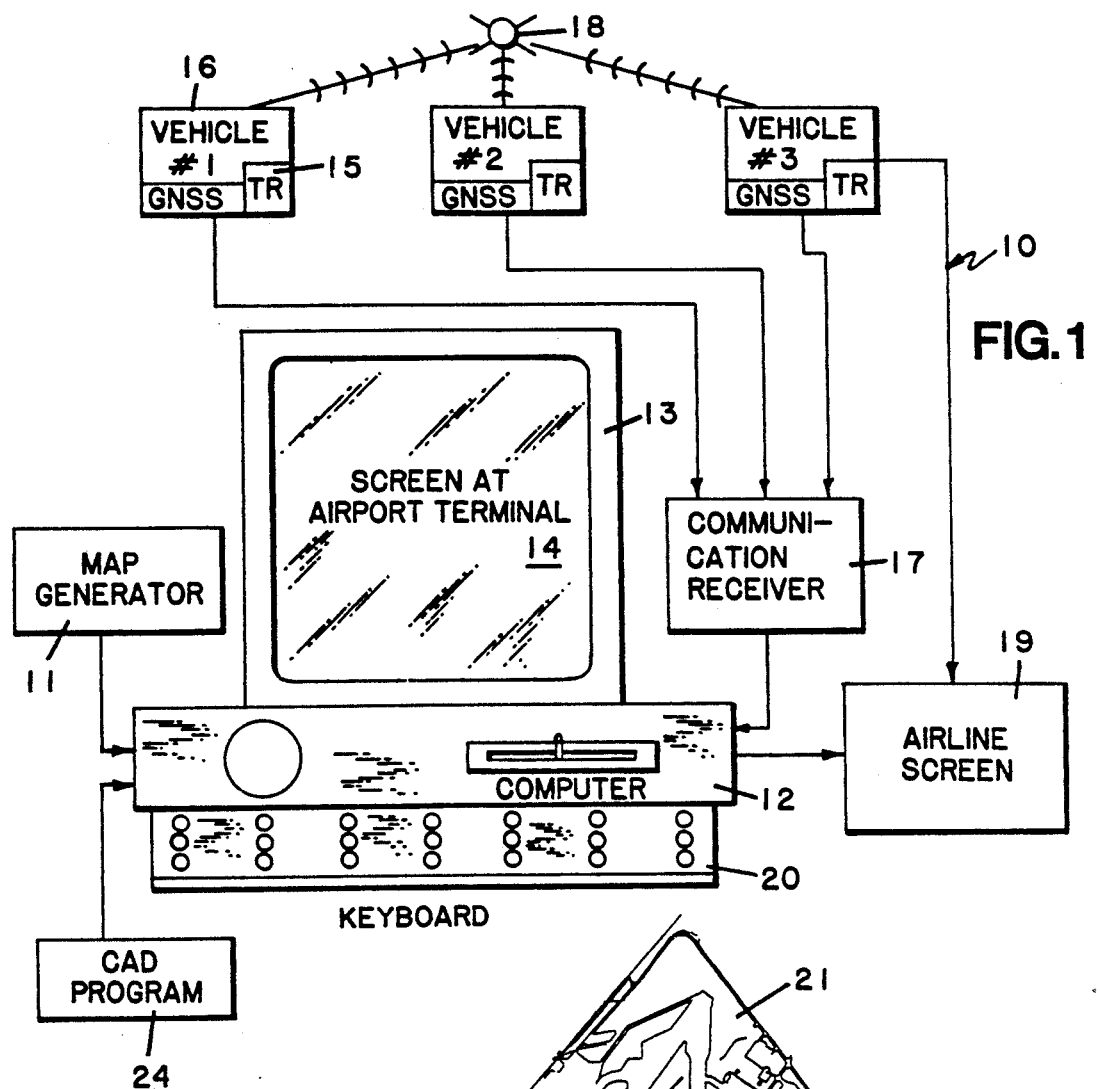
FIG. 1 is a generally schematic view of an airport control/management system incorporating the principles of the present invention.

Referring first to FIG. 1, which best shows the general features of the invention, the airport control/management system, indicated generally by the reference numeral 10, is shown as including a map generator 11 for establishing a precise 3-dimensional digital map of a selected airport space envelope. The map contains global positioning system reference points. The system includes a computer 12 having a monitor 13 with a screen 14. The computer and screen serve to receive and display the 3-dimensional map.

A GNSS receiver 15 is located in a vehicle 16 (#1), which is located in the airport space envelope. The GNSS receiver calculates the heading, velocity, and heading, possibly using reference station corrections. These signals are transmitted to a receiver 17 which, in turn, is connected to the computer 12. The computer contains a program to use the said signals to superimpose a 3-dimensional image corresponding to the vehicle path onto the 3-dimensional map.

The GNSS receiver incorporated in the vehicles contains, in the usual way, access to space satellites 18. The computer 12 contains a computer-aided-drawing (CAD) program 24 that is capable of manipulating the image of the vehicle path and the map to a desired apparent point of observation. A secondary screen 19 may be provided at a suitable airline facility, to show the location and movement of the airline's own vehicle (#3, for instance).

Figure 2:
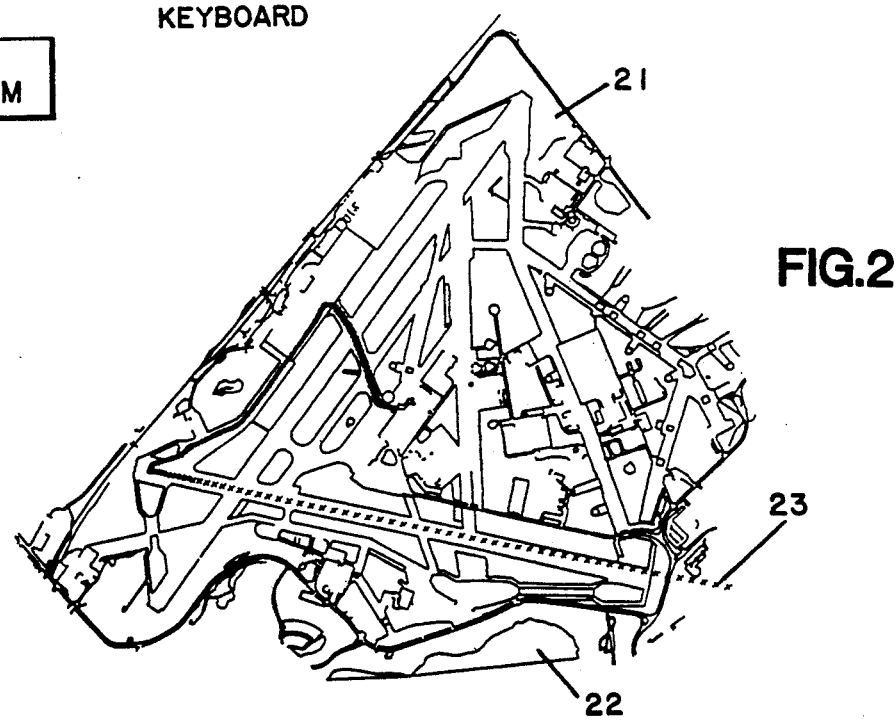
FIG. 2 is a plan view of an airport with a vehicle path imposed, as it appears on a computer screen in the system.

FIG. 2 shows the image 21 as it appears on the monitor screen 14 when the 3-dimensional map 22 of the airport (generated by the generator 11) has the path 23 of a vehicle, such as vehicle #1, imposed upon it. This is a plan view in which the airport map is shown as it appears from directly above and as the vehicle path appears from the same vantage point. The term "airport" can, of course, include not only conventional land-based airports, but also vertiports, heliports, and sea bases.

Figure 3:
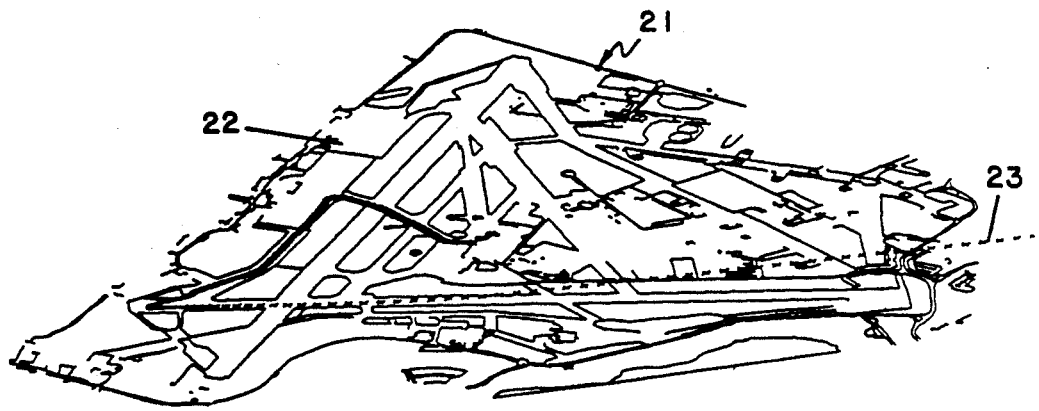
FIG. 3 is a view of the airport and vehicle path as it appears on the screen with a 2-degree viewing angle.

FIG. 3 shows the appearance of the screen 14 when the computer aided drawing program 24 is used to rotate the image to an aspect which is 20 degrees out of the horizontal. In both FIGS. 2 and 3, the vehicle is shown in the taxi to take-off mode but, of course, the appearance would be somewhat similar if it were in the landing mode.

The operation and advantages of the invention will now be readily understood in view of the above description. The method of establishment of a precise 3-dimensional digital map 22 is well-know and makes use of photogrammetry and stereoscopic digitalization techniques. The digital information contained in the map generator 11 is then applied through the computer 12 to the screen 14. At that time, the map 22 appears on the screen and the resulting image can be manipulated by use of the computer-aided drawing program 24 to show the appearance of the airport space envelope as it appears from any desired angle and at any distance. This manipulation is controlled by means of a keyboard 20 or other standard input device, such as a mouse or tablet.

The next step consists of receiving GNSS signals, using an antenna designed for this purpose. The on-board receiver on the aircraft 16 performs the necessary calculations and then transmits the results using a transmitter 15 within the vehicle. The equipment makes use of satellites 18 whose position relative to the earth's center of mass is precisely known. The transmitter 15 sends information as to the aircraft's location, speed, and heading to the receiver 17 and this is presented to the computer 12 for display on the screen 14. The information thus transmitted generates an image 21 on the screen which represents a three-dimensional picture of the vehicle path 23 superimposed on the map 22. The image 21 thus produced can be rotated by the CAD program 24 to any desired angle and zoomed to enlarge or decrease the size.

Figure 4:
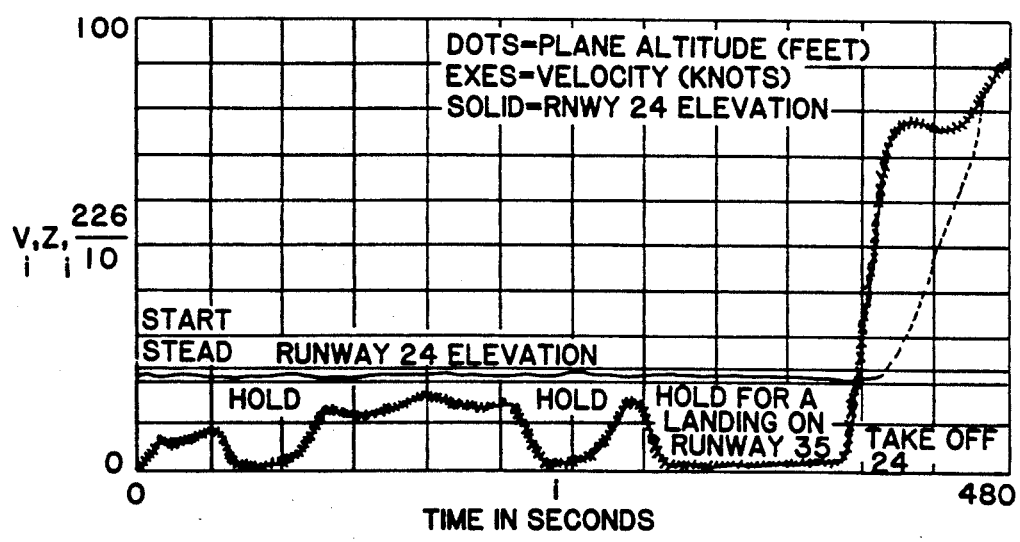
FIG. 4 is a diagram showing the pattern generated by the vehicle in take-off mode.

FIG. 2 shows the appearance of the image 21 in plan, i.e., as the airport and aircraft path appear when viewed from directly above. FIG. 3 shows the image when the observation angle is 20 degrees above the horizontal. It can be seen, then, that an accurate visualization of the vehicle's progress is made possible by selecting various angles of view, as desired. For instance, the chart of FIG. 4 shows a typical elevation profile of an aircraft as it moves about the airport preparatory to taking off and then as it takes off. The image 21 can, of course, be transmitted and displayed on other screens; for instance, the screen 19 is located in the facilities of an airline whose vehicle #3 is within the airport space envelope. Since that airline may only be interested in its own vehicle, their screen image may show only that vehicle, or, if desired, may show the same complete image with other vehicles that is shown on the main screen 14.

It can be seen, then, that the present inventive system provides an integrated airport planning and design tool. It incorporates available technologies of the type that will play an important future role in aviation navigation and air traffic control.

Air transportation is expected to grow at a large rate in the next few years. The predicted growth will place a substantial load on existing airports. Present airports will need to be modernized to support such growth. Building new runways and buildings is expensive and sometime difficult politically. A better method of improving airport capacity and safety may be from improved automation and modernization. Automation and modernization can be a viable method of increasing capacity and safety, while the airports remain within present territorial boundaries.

The present invention, therefore, serves to satisfy three primary objectives. The three objectives are (a) suitability for the task, (a) a wide market acceptance with declining life cycle costs, and (c) ability to integrate easily with other parts of the air traffic control and aircraft navigation systems.

In a practical embodiment of the invention, the computer used was a personal computer with 3-D graphics. It was based on a 386 chip operating at 33 MHZ with a 12 MB hard disk, 80 NS RAM and 387 co-processor. The global position system was the NAVSTAR GPS utilizing earth centered, earth fix (ECEF) coordinates and using the ECEF world geological survey (WGS- 84) which was—ellipsoid- adjusted for geoid separation. The separation was 28.3 meters mean sea level (MSL) elevation at Manchester, N.H. and used in the 3-D map converted between latitude/longitude and N.H. state plane coordinates. The computer used the MSDOS operating system or SCO XENIX OS operating system with modem capability.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Airport control/management system, comprising:
   (a) means establishing a precise 3-dimensional digital map of a selected airport space envelope, the map containing GNSS positioning system reference points,
   (b) a computer with a monitor screen for receiving and displaying the 3-dimensional map,
   (c) means located on at least one vehicle in the airport space envelope to generate and transmit continuous GNSS-based location reports,
   (d) a receiver associated with the computer to receive the said reports from the vehicle,
   (e) means associated with the computer and using the said reports to superimpose 3-dimensional image corresponding to the vehicle path onto the 3-dimensional map, and
   (f) means associated with the 3-dimensional map for generating airport control and management signals as a function of the vehicle path to control the traffic in an airport.

2. Airport control/management system as recited in claim 1, wherein the GNSS includes space satellites.

3. Airport control/management system as recited in claim 1, wherein the computer contains a program for 3-dimensional manipulation of the image of the vehicle path and the map to a desired apparent line of observation.

4. Airport control/management method, comprising the steps of:
   (a) preparing a 3-dimensional digital map of an airport space envelope,
   (b) displaying the digital map to the monitor screen of a computer,
   (c) generating and receiving GNSS positioning signals indicative of the position of a vehicle and using the signals to calculate position, velocity, and heading information about the vehicle, then transmitting said information to a computer,
   (d) applying said information to the digital map on the screen to generate a 3-dimensional image on the screen of the said information on the map, and
   (e) using the said image in the control/management of the traffic in an airport.

5. Airport control/management method as recited in claim 4, including providing the computer with a computer-aided drawing program which permits an operator to select the apparent direction that the image is viewed.

6. Airport control/management method as recited in claim 4, including transmitting the GNSS positioning signals from the aircraft, and determining the aircraft position from an accurately-located space satellite.

7. Airport control/management method as recited in claim 4, including generating the said map by using aerial photogrammetry and stereoscopic digitalization techniques.

8. Airport control/management method as recited in claim 4 wherein the GNSS positioning signals include position, speed, and heading information.

9. Airport control/management method as recited in claim 4, including receiving the said information and displaying it on the 3-dimensional map as a symbol representing the vehicle position.

10. Vehicle traffic control/management system, comprising:
    (a) means establishing a precise 3-dimensional digital map of a selected space envelope, the map containing global positioning system reference points,
    (b) a computer with a monitor screen for receiving and displaying the 3-dimensional map,
    (c) means located on at least one vehicle in the space envelope continuously to transmit GNSS-based location signals,
    (d) a receiver associated with the computer and using the said signals to superimpose a 3-dimensional image corresponding to the vehicle path on the 3-dimensional map, and
    (e) means for using the image to control/manage the traffic in an airport.

11. Vehicle traffic control/management system as recited in claim 10, wherein the GNSS includes space satellites.

12. Vehicle traffic control/management system as recited in claim 10, wherein the computer contains a program for manipulating the image of the vehicle path and the map to a desired apparent position of observation.

* * * * *